United States Patent
Chuang et al.

(10) Patent No.: US 9,333,725 B2
(45) Date of Patent: May 10, 2016

(54) ADHESIVE STRUCTURE WITH HYBRID ADHESIVE LAYER

(71) Applicant: Industrial Technology Research Institute, Chutung, Hsinchu (TW)

(72) Inventors: Meng-Ying Chuang, New Taipei (TW); Kuo-Feng Chen, Taichung (TW); Chih-Chia Chang, Zhubei (TW); Chen-Pang Kung, Zhongli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 83 days.

(21) Appl. No.: 13/928,268

(22) Filed: Jun. 26, 2013

(65) Prior Publication Data

US 2015/0004345 A1 Jan. 1, 2015

(51) Int. Cl.
*B32B 7/14* (2006.01)
*B32B 7/02* (2006.01)
*C09J 5/06* (2006.01)

(52) U.S. Cl.
CPC ... *B32B 7/14* (2013.01); *B32B 7/02* (2013.01); *C09J 5/06* (2013.01); *B32B 2307/20* (2013.01); *B32B 2307/40* (2013.01); *B32B 2307/412* (2013.01); *B32B 2405/00* (2013.01); *Y10T 428/1471* (2015.01); *Y10T 428/1476* (2015.01); *Y10T 428/24752* (2015.01)

(58) Field of Classification Search
CPC .. B32B 7/14; B32B 2307/20; B32B 2307/40; B32B 2307/412; B32B 2405/00; Y10T 428/1471; Y10T 428/1481; Y10T 428/24752; Y10T 428/1476; C09J 5/06
USPC .......................................... 428/41.9
See application file for complete search history.

(56) References Cited

U.S. PATENT DOCUMENTS

| | | | |
|---|---|---|---|
| 4,460,634 A | 7/1984 | Hasegawa | |
| 5,585,178 A * | 12/1996 | Calhoun et al. | 428/343 |
| 6,461,709 B1 * | 10/2002 | Janssen et al. | 428/41.7 |
| 6,707,450 B2 | 3/2004 | Ahn et al. | |
| 2004/0191509 A1 | 9/2004 | Kishioka et al. | |
| 2009/0022967 A1 | 1/2009 | Inenaga | |
| 2009/0162595 A1 * | 6/2009 | Ko et al. | 428/41.9 |
| 2010/0078231 A1 | 4/2010 | Yeh et al. | |
| 2010/0201632 A1 | 8/2010 | Lin | |

(Continued)

FOREIGN PATENT DOCUMENTS

| | | |
|---|---|---|
| CN | 201178521 | 1/2009 |
| TW | 200402456 | 2/2004 |

(Continued)

OTHER PUBLICATIONS

Ikeda et al., "Corrosion Measurement of a Conductive Paste and Anisotropic Conductive Adhesive Films", IEEE Polytroic 2007 Conference, pp. 77-80.
Takeda et al., "A Novel Die Bonding Adhesive—Silver Hied Film", 1997 Electronic Components and Technology Conference, pp. 518-524.
Wang et al., "Nano-Silver Paste with Low Roasting Temperature", IEEE, 2005 6th International Conference on Electronic Packaging Technology, three (3) pages total.

(Continued)

*Primary Examiner* — Patricia L Nordmeyer
(74) *Attorney, Agent, or Firm* — Rabin & Berdo, P.C.

(57) ABSTRACT

An adhesive structure is disclosed. The adhesive structure includes a first layer, a second layer, and a hybrid adhesive layer for adhering the first layer to the second layer. The hybrid adhesive layer includes two or more adhesive units made of different adhesive materials, and the two or more adhesive units are arranged in a planar pattern.

15 Claims, 12 Drawing Sheets

(56) References Cited

U.S. PATENT DOCUMENTS

2011/0210937 A1     9/2011    Kee et al.
2014/0295121 A1*   10/2014   Ogden et al. ................ 428/41.9

FOREIGN PATENT DOCUMENTS

| TW | 200932856 | | 8/2009 |
| TW | 201023288 | | 6/2010 |
| TW | 201247838 | A | 12/2012 |

OTHER PUBLICATIONS

Holmberg et al., "Reliability of Adhesive Joints in Dual Interface Smart Cards", IEEE Polytronic 2002 Conference. pp. 49-53.

Lyons et al., "A New Approach to Using Anisotropically Conductive Adhesives for Flip Chip Assembly", 1995 IEEE, 0569-5503/95/0000-0107, pp. 107-113.

Becker et al, "Printable Die Attach Adhesives for Substrate-On-Chip Packaging", 2003 IEEE, 0-7803-7972-1/03, pp. 250-255.

* cited by examiner

ADHESIVE STRUCTURE WITH HYBRID ADHESIVE LAYER

FIELD OF THE DISCLOSURE

This disclosure relates to an adhesive structure, and more particularly, to an adhesive structure having a hybrid adhesive layer.

BACKGROUND

As consumer electronic devices getting thinner and smaller these days, foldable display apparatuses have become an effective approach to reduce the volume of electronic devices. However, prolonged use of a conventional foldable display apparatus, especially repeated folding of the display apparatus, may result in wrinkles, scratches, or ruptures of the display apparatus.

For example, the conventional foldable display apparatus may be equipped with a touch panel for enabling an input function by touching a panel surface of the display apparatus. The touch panel may be coated with a transparent conductive film for sensing the touching of the panel surface. If the touch panel is wrinkled or ruptured due to repeated foldings, the transparent conductive film will be damaged, thus increasing its electrical resistance, and eventually corrupting the input function of the touch panel.

FIG. 1A is a cross-sectional view of a conventional adhesive structure 100. FIG. 1B is a cross-sectional view of the conventional adhesive structure 100 when it is folded by pressure P.

Referring to FIGS. 1A and 1B, the conventional adhesive structure 100 includes a first layer 120, a second layer 130, and an adhesive layer 140 for adhering the first layer 120 to the second layer 130. When the conventional adhesive structure 100 is folded by applying pressure P on both sides of the conventional adhesive structure 100, the central portion A of the conventional adhesive structure 100 is deformed by the pressure P. In the conventional adhesive structure 100, the adhesive layer 140 is usually formed of a single material throughout the entire layer. The pressure P causes stress that is concentrated in the deformed central portion A. The stress may result in wrinkles or cracks in the central portion A of the conventional adhesive structure 100, and may damage the conventional adhesive structure 100.

SUMMARY

According to an embodiment of the disclosure, an adhesive structure is provided. The adhesive structure includes a first layer, a second layer, and a hybrid adhesive layer for adhering the first layer to the second layer. The hybrid adhesive layer includes two or more adhesive units made of different adhesive materials, and the two or more adhesive units are arranged in a planar pattern.

According to another embodiment of the disclosure, an adhesive tape is provided. The adhesive tape includes a hybrid adhesive layer, and a first sacrificial layer formed on one side of the hybrid adhesive layer. The hybrid adhesive layer includes two or more adhesive units made of different adhesive materials and arranged in a planar pattern.

According to a further embodiment of the disclosure, an adhesive structure is provided. The adhesive structure includes a plurality of layers stacked together, and a plurality of adhesive layers for adhering the plurality of layers to each other. At least one of the plurality of adhesive layers is a hybrid adhesive layer including two or more adhesive units made of different adhesive materials. The two or more adhesive units are arranged in a planar pattern. The different adhesive materials have at least one different property selected from a group including viscoelastic, Young's modulus, adhesion strength, elongation, hardness, optical property, and dielectric property.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1A:
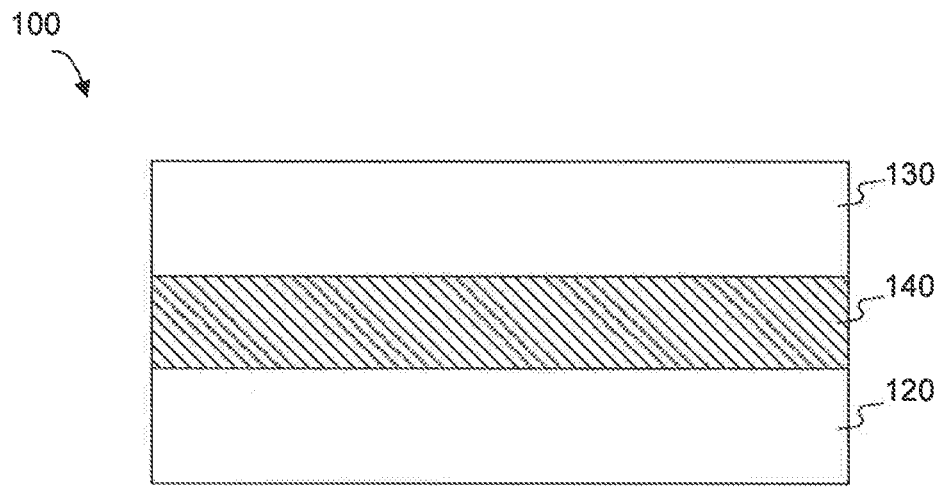
FIG. 1A is a cross-sectional view of a conventional adhesive structure.
Figure 1B:
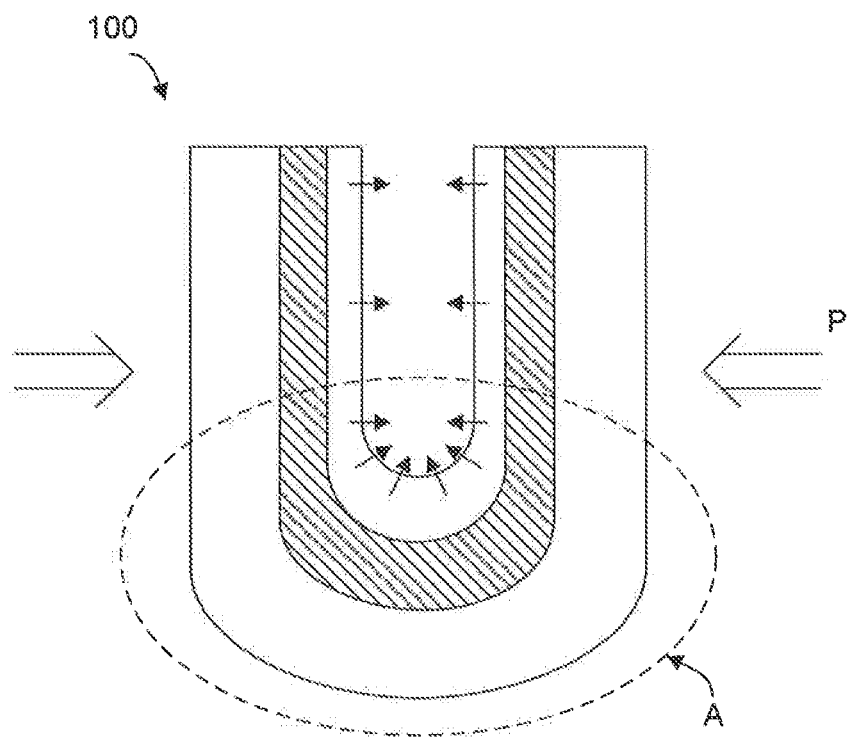
FIG. 1B is a cross-sectional view of the conventional adhesive structure of FIG. 1A when it is folded.
Figure 2A:
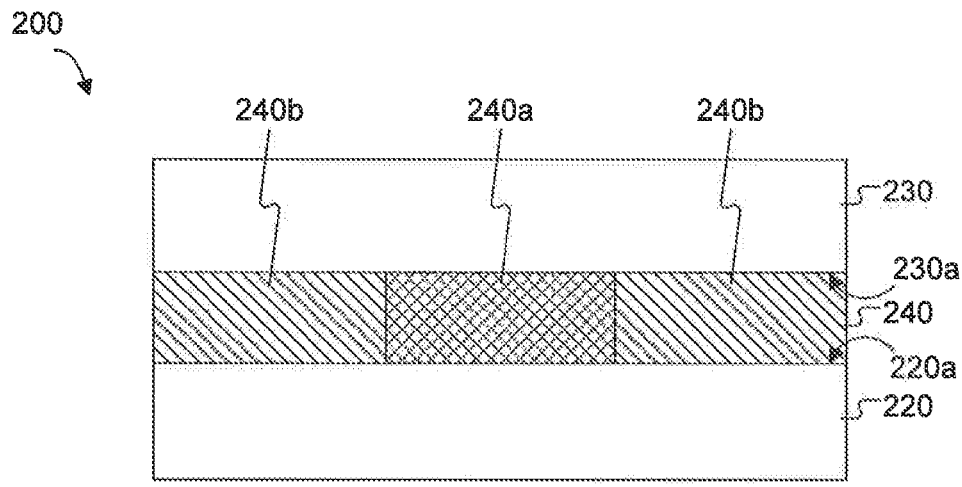
FIG. 2A is a cross-sectional view of an adhesive structure constructed according to an exemplary embodiment.
Figure 2B:
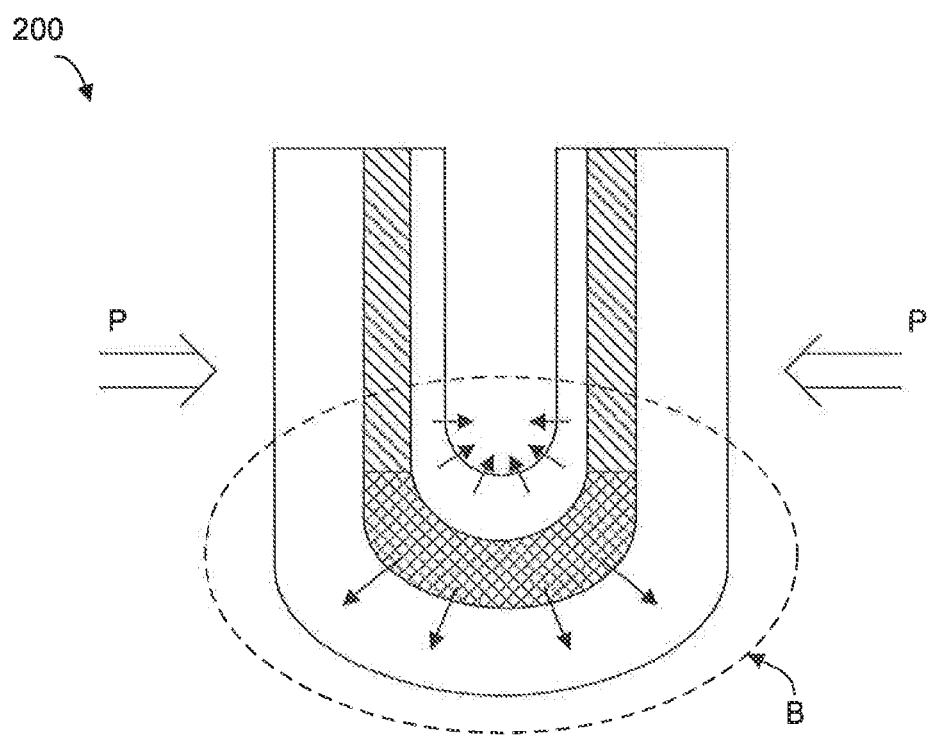
FIG. 2B is a cross-sectional view of the adhesive structure of FIG. 2A when it is folded.

FIG. 2A is a cross-sectional view of an adhesive structure 200 constructed according to an exemplary embodiment. FIG. 2B is a cross-sectional view of the adhesive structure 200 when it is folded by pressure P.

Referring to FIG. 2A, the adhesive structure 200 includes a first layer 220 having a first surface 220a, a second layer 230 having a second surface 230a, and a hybrid adhesive layer 240 disposed on the first surface 220a of the first layer 220 for adhering the first layer 220 to the second layer 230. The hybrid adhesive layer 240 includes a first adhesive unit 240a and two second adhesive units 240b. The first adhesive unit 240a is formed of a first adhesive material, and each of the two second adhesive units 240b is formed of a second adhesive material different from the first adhesive material. The term "adhesive" as used herein refers to organic polymeric compositions useful for adhering together two adherents. Examples of adhesives may include, but are not limited to, non-tacky adhesives (i.e., cold-seal adhesives), heat activated adhesives, structural adhesives, pressure-sensitive adhesives, and optically clear adhesive. Examples for the first adhesive material and the second adhesive material may include, but are not limited to, acrylics, urethanes, epoxies, cyanates, rubbers, synthetic rubbers, styrene block copolymers, (meth) acrylic block copolymers, polyvinyl ethers, polyolefins, and poly(meth)acrylates, wherein the terms (meth)acrylate and (meth)acrylic include both acrylates and methacrylates. The first adhesive material has a lower viscoelasticity than that of the second adhesive material. In some embodiments, a difference between the viscoelasticity of the first adhesive material and the viscoelasticity of the second adhesive material is equal to or more than 10 centipoise (cps). In addition, the first adhesive unit 240a is arranged between two second adhesive units 240b. In some embodiments, a thickness of the second adhesive units 240b may be larger than a thickness of the first adhesive unit 240a, where thickness is measured perpendicular to the surface 220a or 230a. In this case, the second surface 230a of the second layer 230 contact may contact only the second adhesive units 240b.

Although FIG. 2A illustrates that the first layer 220 and the second layer 230 may have the same size and shape, it is to be understood that other embodiments may include layers of different sizes and/or shapes. The first layer 220 may have a different size such as, for example, width, thickness, and/or length, than that of the second layer 230.

Referring to FIG. 2B, when the adhesive structure 200 is folded by applying pressure P on both sides of the adhesive structure 200, the central portion B of the adhesive structure 200 is deformed by the pressure P, and the stress resulting from the pressure P is concentrated in the central portion B. However, since the first adhesive unit 240a made of the first adhesive material having a lower viscoelasticity is located in the central portion B, it functions as a pressure release layer. As a result, the stress that is concentrated in the central portion B is released by the first adhesive unit 240a, and thus the adhesive structure 200 is not damaged by the stress.

Besides different viscoelasticities between the first adhesive material and the second adhesive material, the first adhesive material and the second adhesive material may have other different properties such as, for example, Young's modulus, adhesion strength, elongation, hardness, electrical property, and optical property. For example, a difference between the adhesion of the first material and the adhesion of the second material may be equal to or more than 0.01 N/10 mm. As another example, the first adhesive material may be softer, e.g., 5 times softer, than the second adhesive material. As still another example, the first adhesive material may have a refractive index of 1.3, while second adhesive material may have a refractive index of 1.5. As a further example, the first adhesive material may have a dielectric constant of 2, while the second adhesive material may have a dielectric constant of 20. The different optical and/or electrical properties between the first adhesive material and the second adhesive material allow the adhesive layer 240 to have functions in addition to releasing stress generated by the folding. For example, the adhesive layer 240 may function as an anti-reflection layer, or an insulating layer between two electrically conductive layers.

Although the first adhesive unit 240a in FIGS. 2A and 2B is arranged between two second adhesive units 240b, the disclosure is not limited to this arrangement. The hybrid adhesive layer may include two or more adhesive units made of different adhesive materials, and the two or more adhesive units may be arranged in a plane in various planar patterns such as, for example, a circular pattern, a square pattern, a triangular pattern, and a rectangular pattern. FIGS. 3A-3K are plan views of exemplary hybrid adhesive layers 310, 312, 314, 316, 318, 320, 322, 324, 326, 328, and 330, respectively, constructed according to various embodiments of the disclosure. Each one of the hybrid adhesive layers may be formed on the first surface 220a of the first layer 220 of the adhesive structure 200 illustrated in FIG. 2A.

Figure 3A:
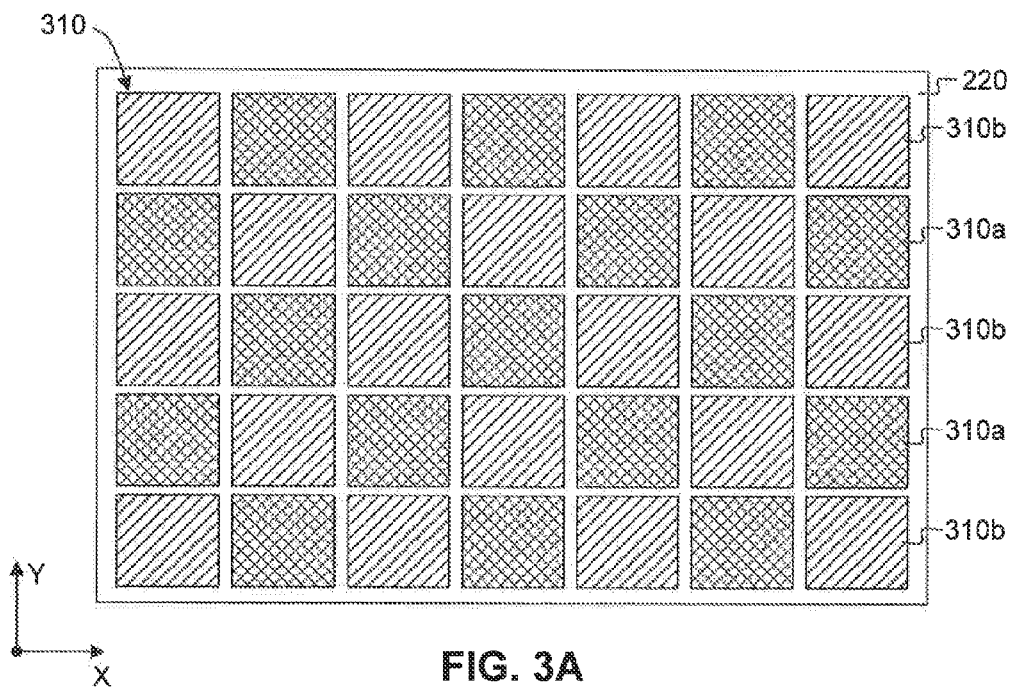
FIGS. 3A-3K are plan views of exemplary hybrid adhesive layers constructed according to various embodiments.

Referring to FIG. 3A, the hybrid adhesive layer 310 includes a plurality of first adhesive units 310a and a plurality of second adhesive units 310b, each formed in a square shape. The first adhesive units 310a are formed of the first adhesive material, and the second adhesive units 310b are formed of the second adhesive material. The first adhesive units 310a and the second adhesive units 310b are alternately arranged in both X direction and Y direction denoted in FIG. 3A. That is, each one of the first adhesive units 310a is adjacent to two or more second adhesive units 310b, and each one of the second adhesive units 310b is adjacent to two or more first adhesive units 310a. There is a gap between each one of the first adhesive units 310a and the neighboring second adhesive units 310b. Alternatively, the first adhesive units 310a and the neighboring second adhesive units 310b may be contiguous with each other. Besides the square shape, the first adhesive units 310a and the second adhesive units 310b may be formed in any other shape such as, for example, a circular shape or a polygon shape. An adhesive structure that includes the hybrid adhesive layer 310 can be folded in any direction, because the first adhesive units 310a having a lower viscoelasticity and distributed around the entire hybrid adhesive layer 310 will release the stress resulting from the folding in any direction.

Figure 3B:
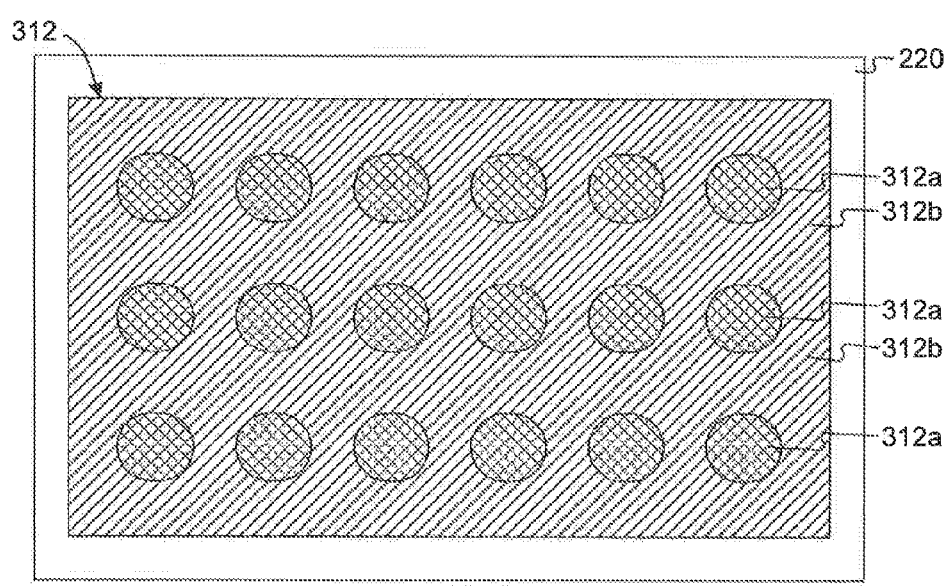

Referring to FIG. 3B, the hybrid adhesive layer 312 includes a plurality of first adhesive units 312a and a second adhesive unit 312b formed continuously throughout the entire hybrid adhesive layer 312. The first adhesive units 312a are formed of the first adhesive material, and the second adhesive units 312b are formed of the second adhesive material. Each one of the first adhesive units 312a is formed in a circular shape and surrounded by the second adhesive unit 312b. Alternatively, the first adhesive units 312a and the second adhesive units 312b may be formed in any other shape such as, for example, a square shape or a polygon shape. Similarly, an adhesive structure that includes the hybrid adhesive layer 312 can be folded in any direction, because the first adhesive units 312a having a lower viscoelasticity and distributed around the entire hybrid adhesive layer 312 will release the stress resulting from the folding in any direction.

Figure 3C:
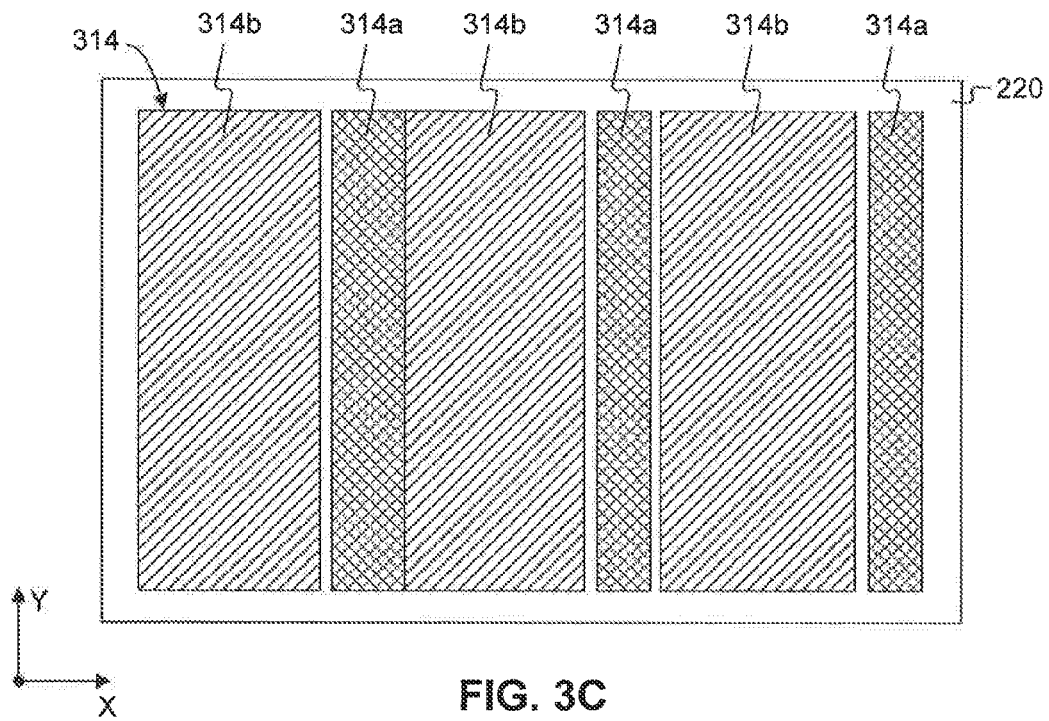

Referring to FIG. 3C, the hybrid adhesive layer 314 includes a plurality of first adhesive units 314a and a plurality of second adhesive units 314b, each formed in a stripe shape. The first adhesive units 314a and the second adhesive units 314b are alternatively arranged in the X direction. Each one of the first adhesive units 314a is adjacent to two second adhesive units 314b, and each one of the second adhesive units 314b is adjacent to two first adhesive units 314a. The area of each one of the second adhesive units 314b is larger than each one of the first adhesive units 314a. The first adhesive units 314a are formed of the first adhesive material, and the second adhesive units 314b are formed of the second adhesive material. An adhesive structure that includes the hybrid adhesive layer 314 can be folded in the X direction along a folding line formed by any one of the first adhesive units 314a, because the first adhesive units 314a having a lower viscoelasticity will release the stress resulting from the folding. In addition, because the second adhesive units 314b have a higher viscoelasticity and a larger area than the first adhesive units 314a, layers located on opposite sides of the hybrid adhesive layer 314, e.g., the first layer 220 and the second layer 230, may be more securely adhered to each other.

Figure 3D:
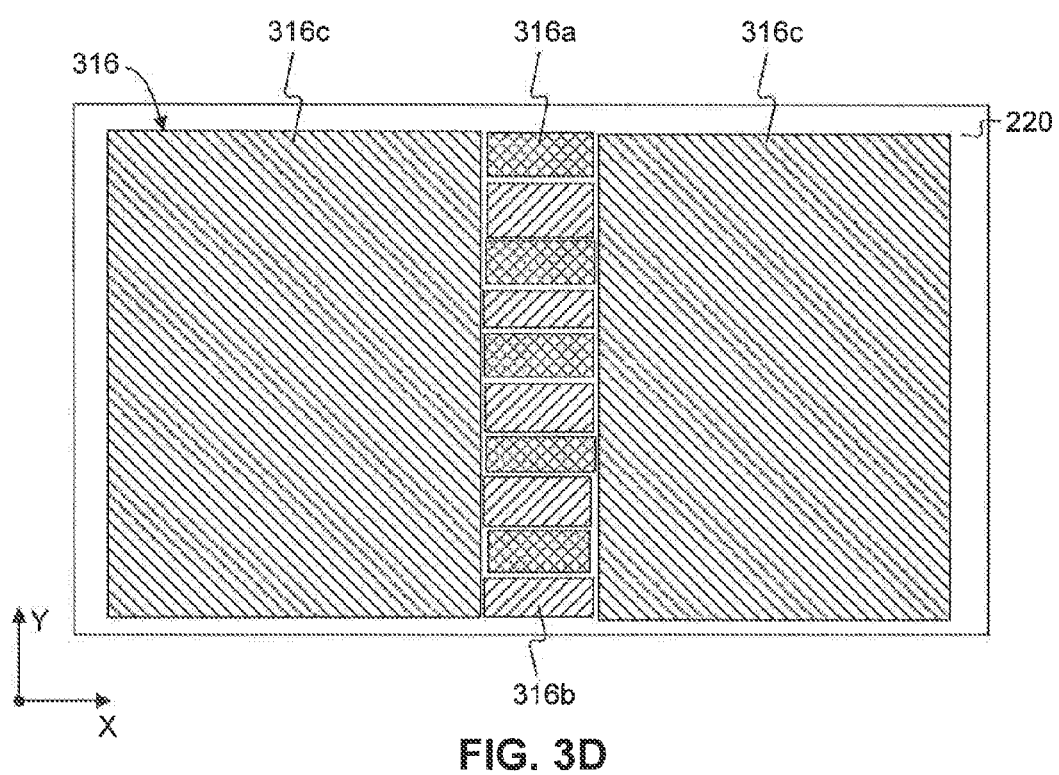

Referring to FIG. 3D, the hybrid adhesive layer 316 includes a plurality of first adhesive units 316a, a plurality of second adhesive units 316b, and two third adhesive units 316c. The first adhesive units 316a and the second adhesive units 316b are alternately arranged in the Y direction to form a column, which is arranged between the two third adhesive units 316c in the X direction. The first adhesive units 316a are formed of the first adhesive material having a relatively low viscoelasticity, and the second adhesive units 316b and the third adhesive units 316c are formed of the second adhesive material having a relatively high viscoelasticity. Alternatively, the second adhesive units 316b and the third adhesive units 316c may be formed of different adhesive materials having different viscoelasticities, but higher viscoelasticity than that of the first adhesive units. An adhesive structure that includes the hybrid adhesive layer 316 can be folded in the X direction along a folding line formed by the column including the first adhesive units 316a and the second adhesive units 316b, because the first adhesive units 316a having a lower viscoelasticity will release the stress resulting from the folding.

Figure 3E:
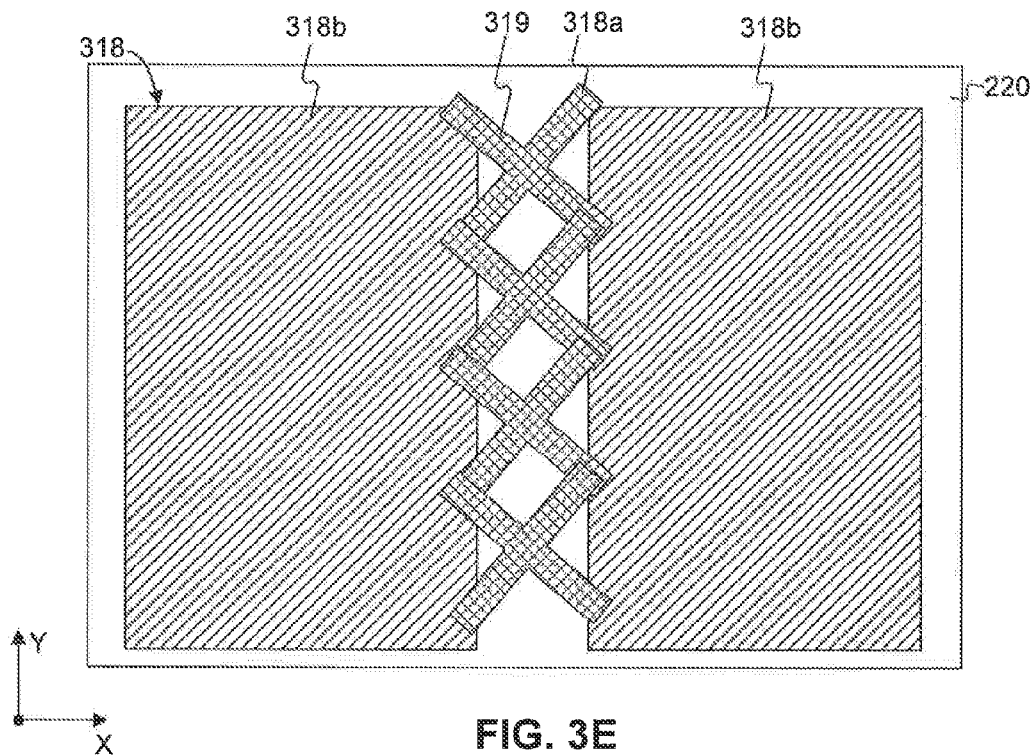

Referring to FIG. 3E, the hybrid adhesive layer 318 includes a plurality of first adhesive units 318a and two second adhesive units 318b. The first adhesive units 318a are formed of the first adhesive material, and the second adhesive units 318b are formed of the second adhesive material. Each one of the first adhesive units 318a is formed in a rectangular shape, and is crossed by another first adhesive unit 318a to form an X shape 319. The plurality of X shapes 319 are arranged in the Y direction to form a column, which is arranged between the two second adhesive units 318b in the X direction. An adhesive structure that includes the hybrid adhesive layer 318 can be folded in the X direction along a folding line formed by the column including the first adhesive units 318a, because the first adhesive units 318a having a lower viscoelasticity will release the stress resulting from the folding.

Figure 3F:
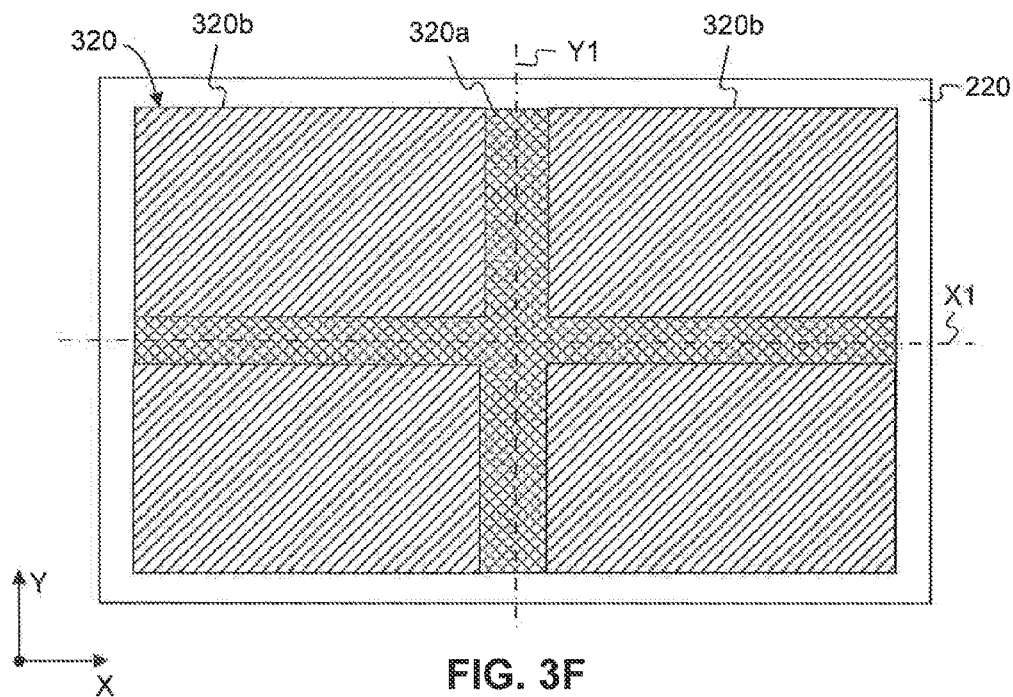

Referring to FIG. 3F, the hybrid adhesive layer 320 includes a first adhesive unit 320a and four second adhesive units 320b. The first adhesive unit 320a is formed in a cross shape with two arms extending in the X direction and two arms extending in the Y direction. Each arm of the first adhesive unit 320a is formed between two adjacent second adhesive units 320b. The first adhesive unit 320a is formed of the first adhesive material, and the second adhesive units 320b are formed of the second adhesive material. An adhesive structure that includes the hybrid adhesive layer 320 can be folded in the X direction along a folding line Y1 formed by the two arms of the first adhesive unit 320a extending in the Y direction, and then folded in the Y direction along a folding line X1 formed by the two arms of the first adhesive unit 320a extending in the X direction. Thus, multiple folding may be achieved in this adhesive structure.

Figure 3G:
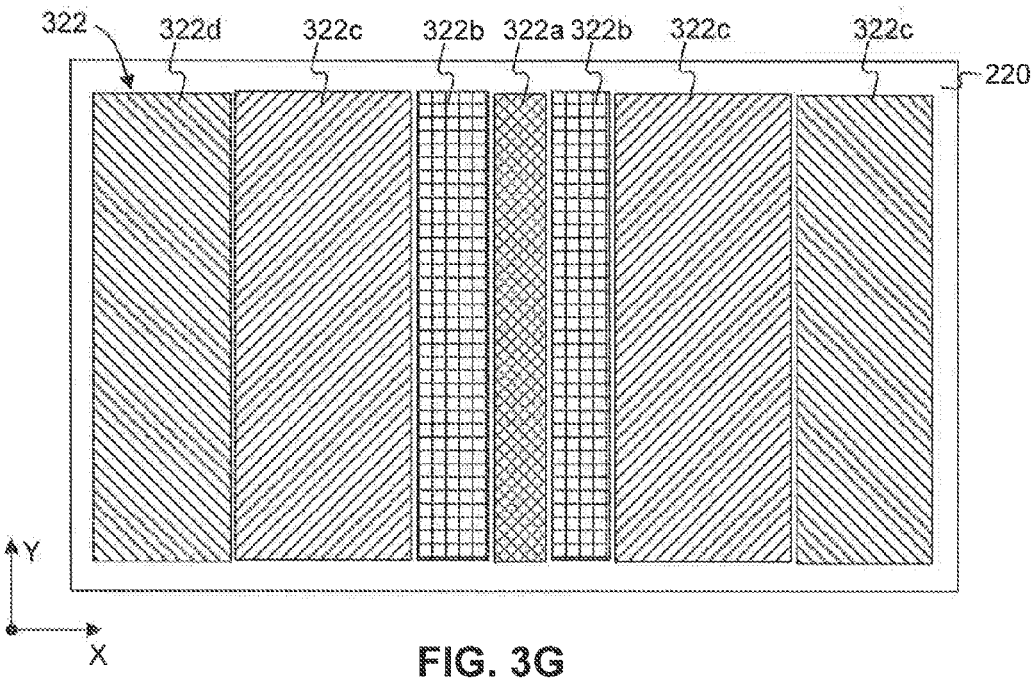

Referring to FIG. 3G, the hybrid adhesive layer 322 includes a first adhesive unit 322a, two second adhesive units 322b, two third adhesive units 322c, and two fourth adhesive units 322d. The second through fourth adhesive units 322b, 322c, and 322d are disposed on each side of the first adhesive unit 322a in the same order along the X direction from the first adhesive unit 322a to the sides of the hybrid adhesive layer 322. The first adhesive unit 322a is formed of the first adhesive material, the second adhesive units 322b are formed of a third adhesive material, the third adhesive units 322c are formed of the second adhesive material, and the fourth adhesive units 322d are formed of a fourth adhesive material. The viscoelasticities of the first and third adhesive materials are lower than those of the second and fourth adhesive materials. Therefore, the first and second adhesive units 322a and 322b form a stress releasing region that can release stress when an adhesive structure including the hybrid adhesive layer 322 is folded in the X direction along a folding line that runs in the Y direction within the stress releasing region.

Figure 3H:
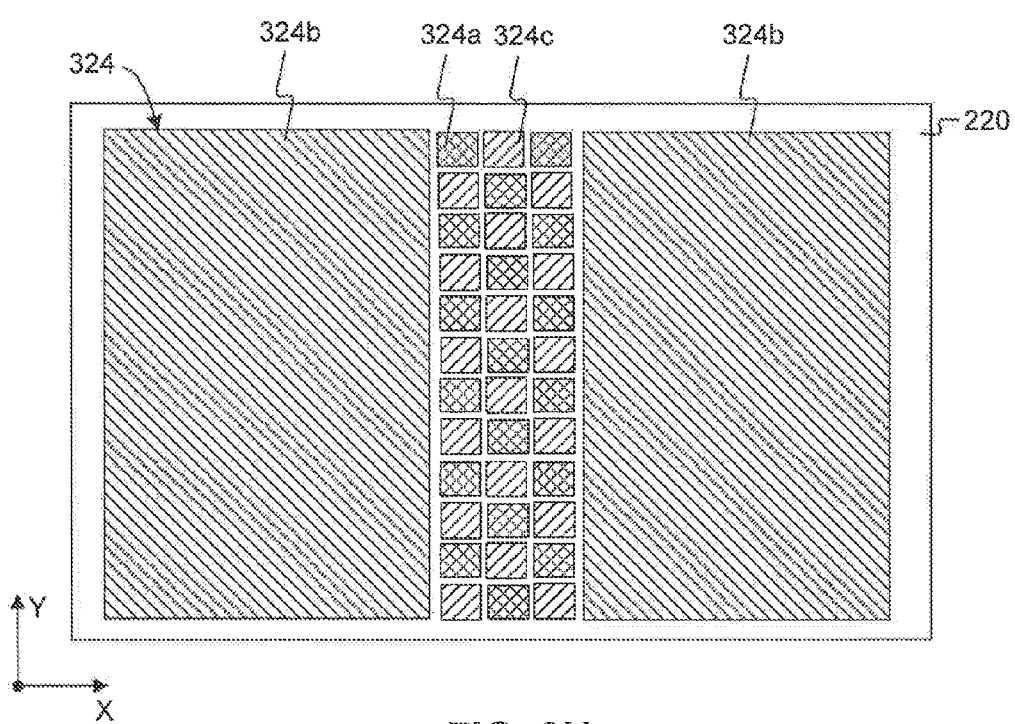

Referring to FIG. 3H, the hybrid adhesive layer 324 includes a plurality of first adhesive units 324a, two second adhesive units 324b, and a plurality of filling units 324c. The first adhesive units 324a and the filling units 324c are alternately arranged in both the X direction and the Y direction to form a stress releasing region, which is arranged between the two second adhesive units 324b in the X direction. The first adhesive units 324a are formed of the first adhesive material, and the second adhesive units 324b are formed of the second adhesive material. The filling units 324c are formed of transparent filling materials such as polymer resin, or non-tack materials such as, for example, polyisobutylene, polyisoprene, isobutylene-isoprene copolymer and styrene-butadiene copolymer. Alternatively, the filling units 324c may be formed of air. The first adhesive units 324a and the filling units 324c form the stress releasing region that can release stress when an adhesive structure including the hybrid adhesive layer 324 is folded in the X direction along a folding line that runs in the Y direction within the stress releasing region.

Figure 3I:
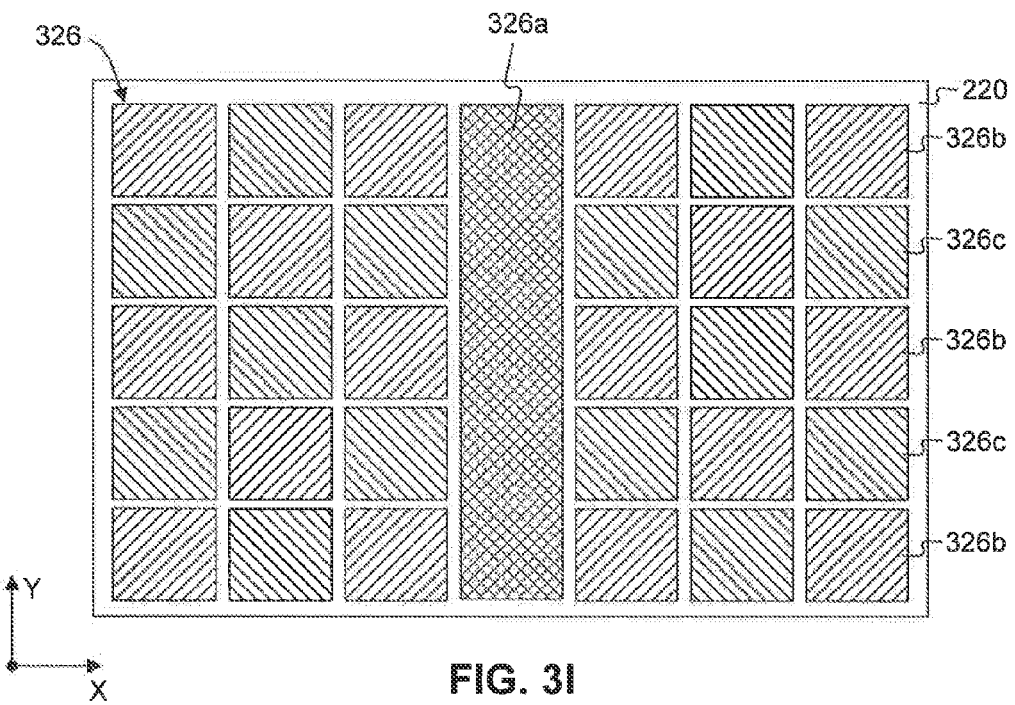

Referring to FIG. 3I, the hybrid adhesive layer 326 includes a first adhesive unit 326a, a plurality of second adhesive units 326b, and a plurality of filling units 326c. The first adhesive unit 326a is formed of the first adhesive material, and the second adhesive units 326b are formed of the second adhesive material. The first adhesive unit 326a forms a stress releasing region. The second adhesive units 326b and the filling units 326c are alternately arranged in both the X direction and the Y direction, outside of the stress releasing region. Similarly, the filling units 326c are formed of air or non-tack materials such as, for example, polyisobutylene, polyisoprene, isobutylene-isoprene copolymer and styrene-butadiene copolymer. The first adhesive unit 326a forms the stress releasing region that can release stress when an adhesive structure including the hybrid adhesive layer 326 is folded in the X direction along a folding line that runs in the Y direction within the stress releasing region.

Figure 3J:
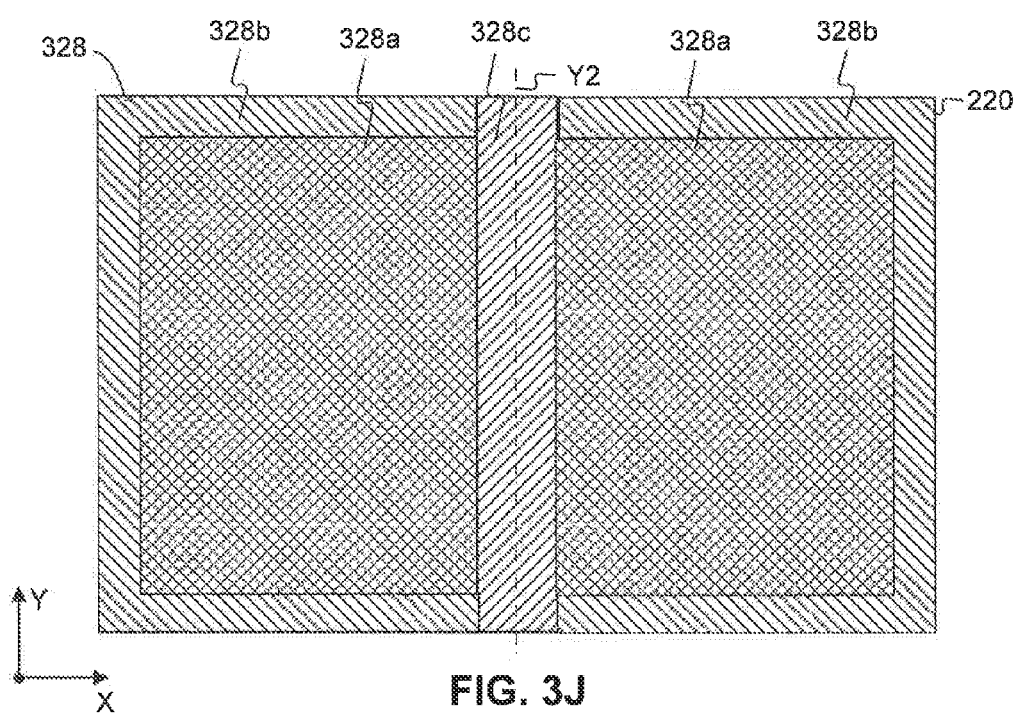

Referring to FIG. 3J, the hybrid adhesive layer 328 includes two first adhesive units 328a, two second adhesive units 328b, and a third adhesive unit 328c. The second adhesive units 328b are disposed to cover peripheral regions of the first layer 220 to surround the first layer 220, except for a central region which is covered by the third adhesive unit 328c. The remaining region of the first layer 220 is covered by the first adhesive units 328a. The second adhesive units 328b are formed of the second adhesive material having a relatively high adhesion such that the first layer 220 and the second layer 230 (not shown) can be firmly adhered together. The first adhesive units 328a and the third adhesive unit 328c are formed of an adhesive material having a relatively low adhesion to form a stress releasing region that can release stress when the hybrid adhesive layer 328 is folded in the X direction along a folding line Y1. In certain embodiments, at least one of the first adhesive units 328a and the third adhesive unit 328c may be replaced by air or transparent filler material such as polymer resin.

Figure 3K:
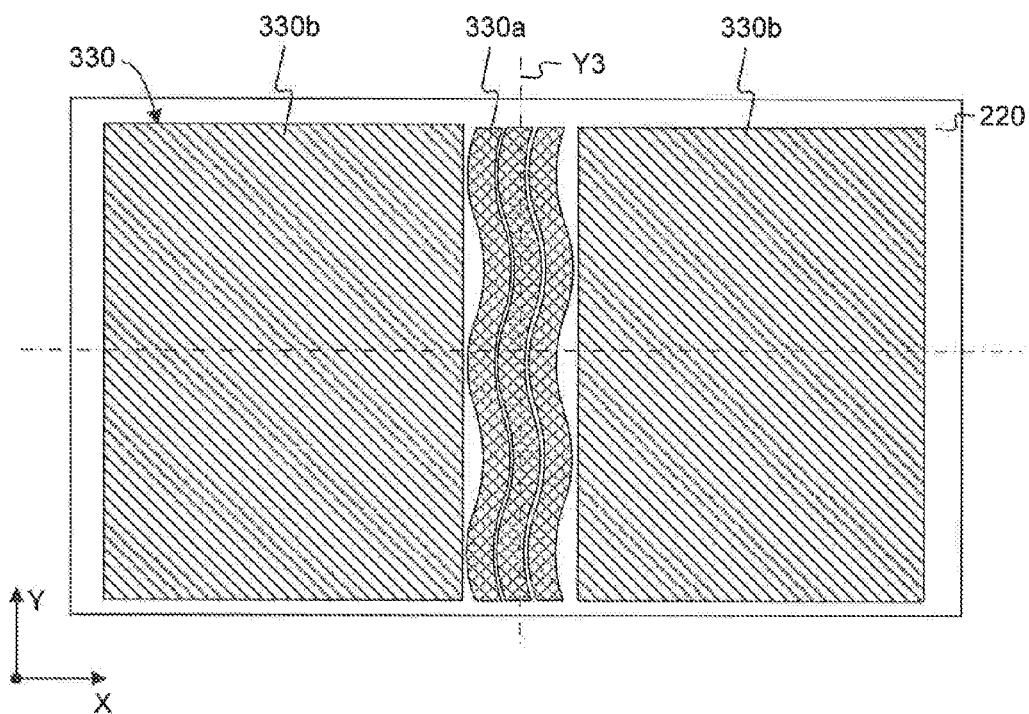

Referring to FIG. 3K, the hybrid adhesive layer 330 includes three first adhesive units 330a disposed between two second adhesive units 330b. The first adhesive units 330a are formed of the first adhesive material to form a stress releasing region, and the second adhesive units 330b are formed of the second adhesive material. Each one of the first adhesive units 330a is formed in an S-shape. An adhesive structure that includes the hybrid adhesive layer 330 can be folded along a folding line Y3 extending in the Y direction, and twisted along a twisting line X3 extending in the X direction.

By arranging the two or more adhesive units having difference viscoelasticities in various planar patterns in the hybrid adhesive layer, an adhesive structure formed with the hybrid adhesive layer can be folded in various directions. Although illustrative patterns have been described herein with reference to FIGS. 3A-3K, it is to be understood that the disclosure is not limited to these embodiments, and that various other changes and modifications may be made by one skilled in the art without departing from the scope or spirit of the disclosure.

In one embodiment, the above-described adhesive structure 200 may be implemented as a display device in which the first layer 220 is a display panel and the second layer 230 is a transparent control panel for controlling the display panel. The hybrid adhesive layer 240 may adhere the control panel 230 to the display panel 220. Although FIG. 2A illustrates each one of the display panel 220 and the control panel 230 as a single layer, it is to be understood that the display panel 220 and the control panel 230 may each include multiple sub-layers.

In one embodiment, the adhesive structure 200 may be implemented as a single-sided adhesive tape to be mounted to a box, panel, wall, etc. In this embodiment, the first layer 220 is a sacrificial layer and the second layer 230 is a protective layer. The sacrificial layer 220 is adhered to the hybrid adhesive layer 240 with a reduced adhesive force, such that the sacrificial layer 220 can be easily pulled off from the hybrid adhesive layer 240 when the single-sided adhesive tape is to be mounted to the box, panel, wall, etc. The protective layer 230 protects the hybrid adhesive layer 240 from ambient environment. The protective layer 230 may have additional properties such as, for example, anti-glare, anti-reflection, anti-fingerprint, etc.

In another embodiment, the adhesive structure 200 may be implemented as a double-sided adhesive tape. In this embodiment, both of the first layer 220 and the second layer 230 may be sacrificial layers adhered to the hybrid adhesive layer 240 with reduced adhesive forces.

Figure 4:
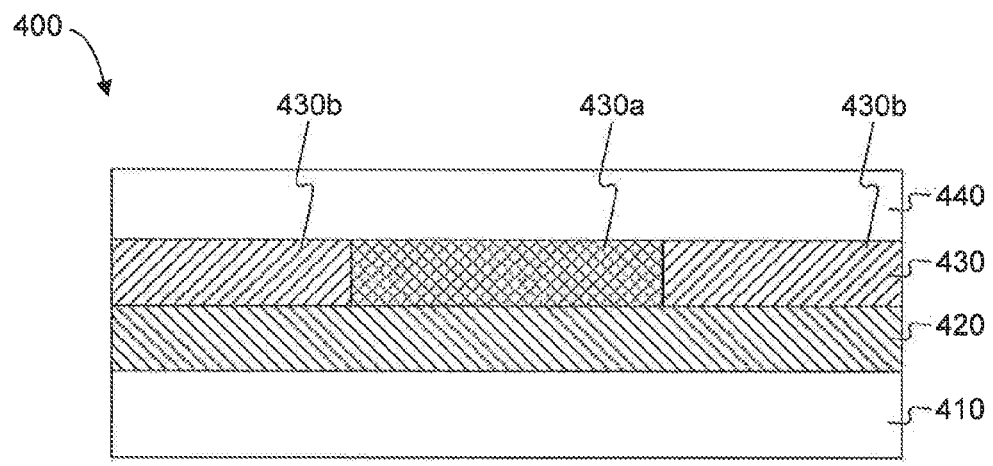
FIG. 4 is a cross-sectional view of an electronic device constructed according to an exemplary embodiment.

In some embodiments, the above-described hybrid adhesive layer may be implemented as an insulating layer in electronic devices. FIG. 4 is a cross-sectional view of an electronic device 400 constructed according to one such embodiment. The electronic device 400 is formed with a substrate 410, a transparent conductive layer 420, an insulating hybrid adhesive layer 430, and a passivation layer 440. The transparent conductive layer 420 is formed of a transparent electric conductive material such as, for example, indium tin oxide (ITO). The insulating hybrid adhesive layer 430 adheres the passivation layer 440 to the transparent conductive layer 420. The insulating hybrid adhesive layer 430 includes a first insulating adhesive unit 430a arranged between two second insulating adhesive units 430b. Alternatively, the insulating hybrid adhesive layer 430 may be any one of the hybrid adhesive layers 310, 312, 314, 316, 318, 320, 322, 324, 326, 328, and 330 illustrated in FIGS. 3A-3K. The insulating hybrid adhesive layer 430 may be formed of a material which has a high dielectric constant and a high adhesion. Exemplary materials used to form the insulating hybrid adhesive layer 430 may include, but are not limited to, UV exposure curing adhesive, thermal plastic, and water glue. Thermal plastic, as used herein, is a polymer that becomes pliable or moldable above a specific temperature, and returns to a solid state upon cooling. The water glue may be an optically transparent adhesive.

Figure 5:
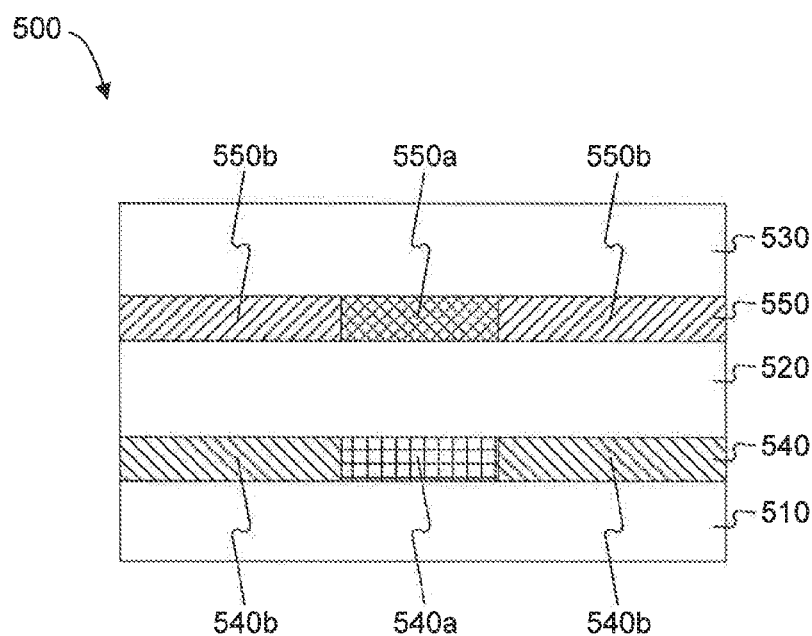
FIG. 5 is a cross-sectional view of a multi-layered adhesive structure constructed according to an exemplary embodiment.

In some embodiment, the above-described hybrid adhesive layers may be included in a multi-layered adhesive structure. FIG. 5 is a cross-sectional view of a multi-layered adhesive structure 500 constructed according to one such embodiment. The multi-layered adhesive structure 500 includes a first layer 510, a second layer 520, a third layer 530, a first adhesive layer 540 for adhering the second layer 520 to the first layer 510, and a second adhesive layer 550 for adhering the third layer 530 to the second layer 520. The first adhesive layer 540 is a hybrid adhesive layer including a first adhesive unit 540a arranged between two second adhesive units 540b. The second adhesive layer 550 is a hybrid adhesive layer including a third adhesive unit 550a arranged between two fourth adhesive units 550b. The first adhesive unit 540a and the third adhesive unit 550a may be formed of the same adhesive material, and the second adhesive unit 540b and the fourth adhesive unit 550b may be formed of the same adhesive material. Alternatively, the first adhesive unit 540a and the fourth adhesive unit 550b may be formed of the same adhesive material, and the second adhesive unit 540b and the third adhesive unit 550a may be formed of the same adhesive material. Each one of the first adhesive layer 540 and the second adhesive layer 550 may be any one of the hybrid adhesive layers 310, 312, 314, 316, 318, 320, 322, 324, 326, 328, and 330, illustrated in FIGS. 3A-3K. In certain embodiments, either one of the adhesive layers 540 and 550 may be a uniform adhesive layer formed of the same material.

The multi-layered adhesive structure 500 may be implemented as an organic light emitting display device in which the first layer 510 is an organic light emitting display panel, the second layer 520 is a touch panel, and the third layer 530 is a feed back panel. Each one of the organic light emitting display panel 510, the touch panel 520, and the feed back panel 530 may include a transparent conducting oxide (TCO) which may be subjected to different degrees of stress when the organic light emitting display device 500 is folded. By including hybrid adhesive layers 540 and 550 into the organic light emitting display device 500, and selecting proper adhesive materials for each of the adhesive units, the stress may be released by the hybrid adhesive layers 540 and 550 when the organic light emitting display device 500 is folded.

The above-described hybrid adhesive layers may be formed by coating a substrate with liquid adhesive materials or adhesive films. In one embodiment, both of the first adhesive unit 240a and the second adhesive units 240b of the hybrid adhesive layer 240 of FIG. 2A may be formed by coating the first layer 220 with liquid adhesive materials.

Figure 6:
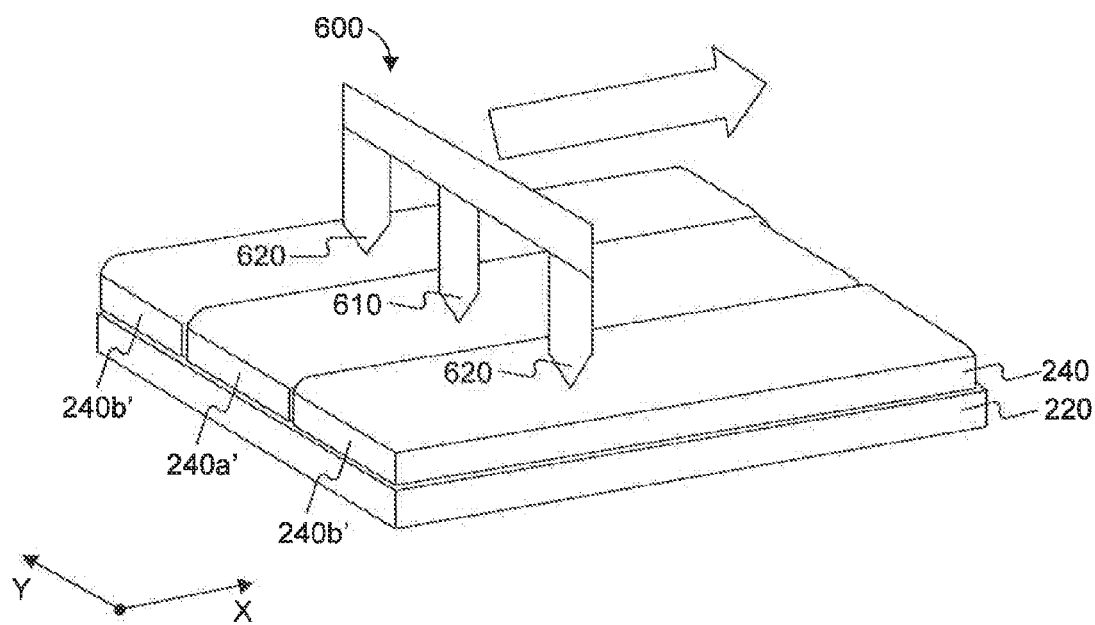
FIG. 6 illustrates forming a hybrid adhesive layer according to an exemplary embodiment.

FIG. 6 illustrates a method of forming the hybrid adhesive layer 240 on the first layer 220 according to an embodiment. An adhesive applicator 600 may apply a first liquid adhesive material 240a' for forming the first adhesive unit 240a and a second liquid adhesive material 240b' for forming the second adhesive units 240b. Referring to FIG. 6, the adhesive applicator 600 includes a first nozzle 610 for dispensing the first liquid adhesive material 240a', and two second nozzles 620 for dispensing the second liquid adhesive material 240b'. The two second nozzles 620 are disposed at opposite sides of the first nozzle 610. The first and second nozzles 610 and 620 of the adhesive applicator 600 moves along the X direction parallel to surface 220a of the first layer 220 from one side of the first layer 220 to an opposite side of the first layer 220, while dispensing the first and second liquid adhesive materials 240a' and 240b' in parallel stripes. After the first and second nozzles 610 and 620 reach the opposite side of the first layer 220, the adhesive applicator 600 stops dispensing the first and second liquid adhesive materials 240a' and 240b'.

In one embodiment, both of the first and second liquid adhesive materials 240a' and 240b' may be light-curable materials. In such case, the first and second liquid adhesive materials 240a' and 240b' dispensed on the first layer 220 may be cured by a ultra-violet (UV) light irradiated from a UV lamp, so that the first and second liquid adhesive materials are solidified to form the first and second adhesive units 240a and 240b, respectively, as shown in FIG. 2A. As a result, the hybrid adhesive layer 240 including the first and second adhesive units 240a and 240b are formed.

In another embodiment, the first adhesive material 240a' may be a light-curable material, and the second adhesive material 240b' may be a heat-curable material. In such case, the first layer 220 dispensed with the first and second liquid adhesive materials 240a' and 240b' may be placed in an oven to undergo a thermal process. After the thermal process, the second adhesive material 240b' is hardened by the heat to become the second adhesive units 240b, while the first adhesive material 240a' remains unchanged. Then, the first layer 220 formed with the first adhesive material 240a' and the second adhesive units 240b may be irradiated by a UV light from a UV lamp. A mask may be placed between the first layer 220 and the UV lamp, such that only the first adhesive material 240a' is exposed to the UV light. After the UV exposure, the first adhesive material 240a' is hardened by the UV light to become the first adhesive unit 240a. As a result, the hybrid adhesive layer 240 including the the first and second adhesive units 240a and 240b are formed.

In another embodiment shown in FIGS. 7A-7E, a first adhesive unit 740a of a hybrid adhesive layer 740 is formed by coating a first layer 720 with a first liquid adhesive material, and second adhesive units 740b of the hybrid adhesive layer 740 are formed by coating the first layer 720 with adhesive films. The first liquid adhesive material for forming the first adhesive unit 740a may have a lower viscoelasticity than that of the adhesive films for forming the second adhesive units 740b.

Figure 7A:
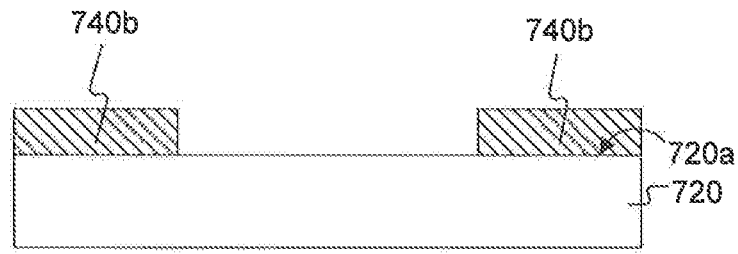
FIGS. 7A-7E illustrate forming a hybrid adhesive layer according to another exemplary embodiment.
Figure 7B:
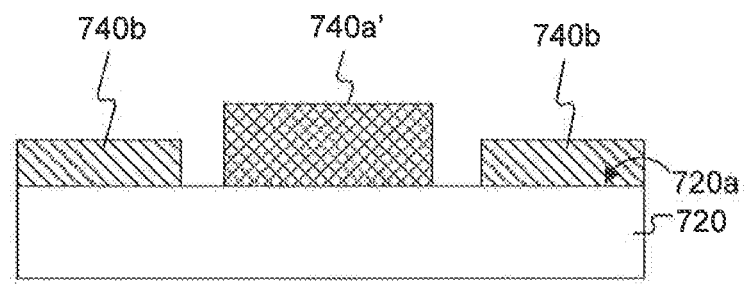
Figure 7C:
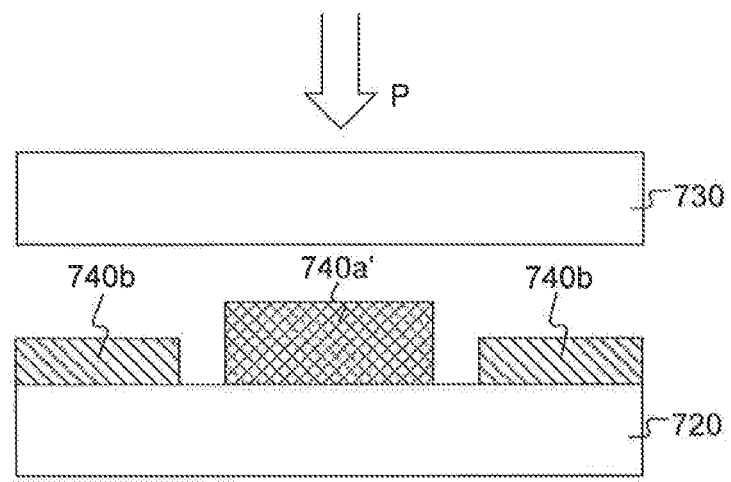
Figure 7D:
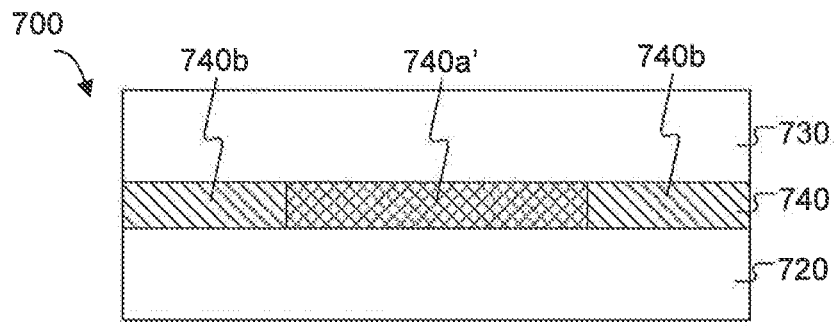
Figure 7E:
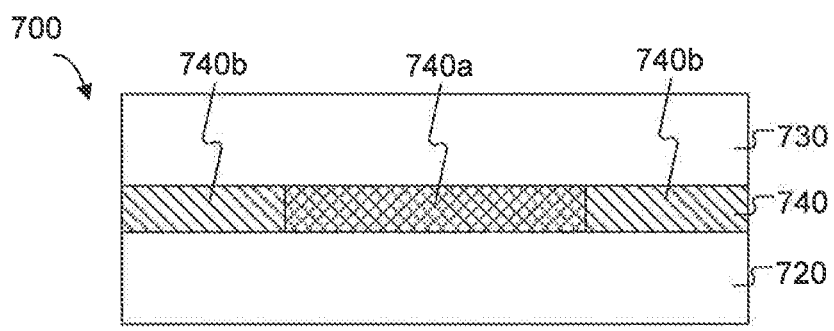

First, the adhesive films are laminated on a surface 720a of the first layer 720, as shown in FIG. 7A. Next, the first liquid adhesive material 740a' is dispensed on surface 720a of the first layer 720 between the second adhesive units 740b, as shown in FIG. 7B. The first liquid adhesive material 740a' may be dispensed by using a table coater or a spin coater. At this time, the first liquid adhesive material 740a' does not fill the entire space between the second adhesive units 740b, and the thickness of the first liquid adhesive material 740a' is larger than the thickness of the second adhesive units 740b. Next, referring to FIG. 7C, a second layer 730 to be adhered to the first layer 720 is lowered and pressed against the first adhesive material 740a' and the second adhesive units 740b by a pressure P. As a result of the pressing by the second layer 730, the first liquid adhesive material 740a' spreads out to fill the entire space between the second adhesive units 740b, as shown in FIG. 7D. Finally, the first liquid adhesive material 740a' is cured by a UV light irradiated from a UV lamp, so that the first liquid adhesive material 740a' is solidified to form the first adhesive unit 740a, as shown in FIG. 7E. As a result, an adhesive structure 700 is formed. The adhesive structure 700 includes the hybrid adhesive layer 740, which includes the first adhesive unit 740a and the second adhesive units 740b.

Other embodiments will be apparent to those skilled in the art from consideration of the specification and practice of the embodiments disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A display device, comprising:
a display panel having a first surface;
a transparent control panel having a second surface; and
a hybrid adhesive layer disposed on the first surface of the display panel for adhering the display panel to the transparent control panel,
wherein the hybrid adhesive layer includes a first adhesive unit made of a first adhesive material, and second adhesive units made of a second adhesive material,
wherein the first adhesive unit and the second adhesive units are arranged in a first direction,
wherein the first adhesive material and the second adhesive material have respective viscoelasticities, the viscoelasticity of the first adhesive material being lower than that of the second adhesive material, and a difference between the viscoelasticity of the second adhesive material and the viscoelasticity of the first adhesive material is equal to or more than 10 centipoise (cps), and
wherein the display device is folded in the first direction along a folding line formed by the first adhesive unit.

2. The display device of claim 1, wherein at least one of the first adhesive unit and the second adhesive units has a shape selected from the group consisting of a circular shape, a square shape, a triangular shape, and a rectangular shape.

3. The display device of claim 1, wherein the first adhesive material and the second adhesive material have different adhesion strengths.

4. The display device of claim 1, wherein the first adhesive material and the second adhesive material have different Young's moduluses.

5. The display device of claim 1, wherein the first adhesive material and the second adhesive material have different hardnesses.

6. The display device of claim 1, wherein the first adhesive material and the second adhesive material have different optical properties.

7. The display device of claim 1, wherein the first adhesive material and the second adhesive material have different electrical properties.

8. The display device of claim 1, wherein the first adhesive unit and the second adhesive units have different areas.

9. The display device of claim 1, wherein the first adhesive unit and the second adhesive units have different thicknesses.

10. The adhesive structure display device of claim 1, wherein at least one of the display panel and the transparent control panel includes a plurality of sub-layers.

11. The display device of claim 10, wherein the plurality of sub-layers are formed of the same material.

12. The display device of claim 10, wherein the plurality of sub-layers are formed of different materials.

13. The display device of claim 1, wherein the hybrid adhesive layer includes at least one filling unit.

14. A display device, comprising:

a display panel having a first surface;

a hybrid adhesive layer disposed on the first surface of the display panel and including a first adhesive unit made of a first adhesive material, and second adhesive units made of a second adhesive material, the first adhesive unit and the second adhesive units being arranged in a first direction; and a first sacrificial layer formed on one side of the hybrid adhesive layer, wherein the first adhesive material and the second adhesive material have respective viscoelasticities, the viscoelasticity of the first adhesive material being lower than that of the second adhesive material and a difference between the viscoelasticity of the second adhesive material and the viscoelasticity of the first adhesive material is equal to or more than 10 centipoise (cps), and wherein the display device is folded in the first direction along a folding line formed by the first adhesive unit.

15. A display device, comprising:

a plurality of layers stacked together and comprising a display panel and a transparent control panel; and a plurality of adhesive layers for adhering the plurality of layers to each other, wherein at least one of the plurality of adhesive layers is a hybrid adhesive layer comprising a first adhesive unit made of a first adhesive material, and second adhesive units made of a second adhesive material, the first adhesive unit and the second adhesive units being arranged in a first direction, wherein the first adhesive material and the second adhesive material have respective viscoelasticities, and the viscoelasticity of the first adhesive material is lower than that of the second adhesive material and a difference between the viscoelasticity of the second adhesive material and the viscoelasticity of the first adhesive material is equal to or more than 10 centipoise (cps), and wherein the display device is folded in the first direction along a folding line formed by the first adhesive unit.

* * * * *